Aug. 23, 1949.
K. W. STRUNK
2,479,791
PILLOW BLOCK BEARING
Filed June 10, 1946
2 Sheets-Sheet 1
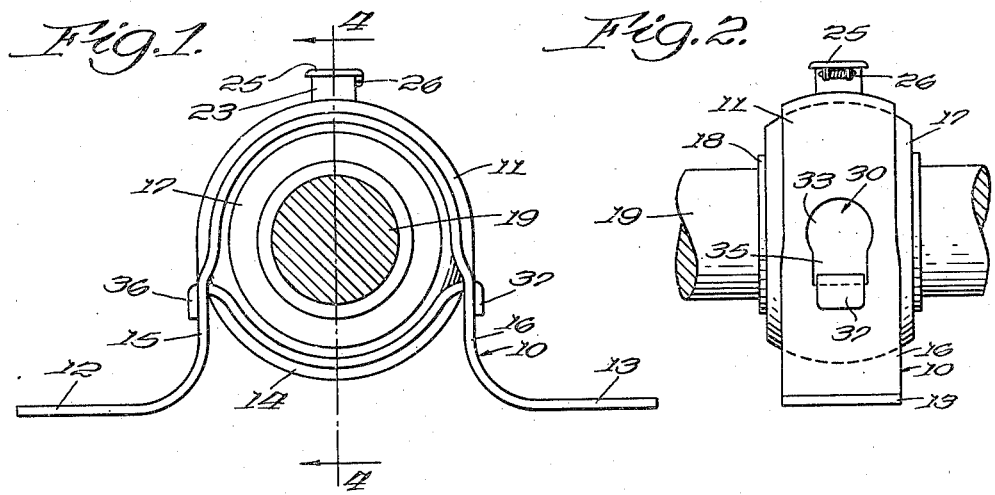
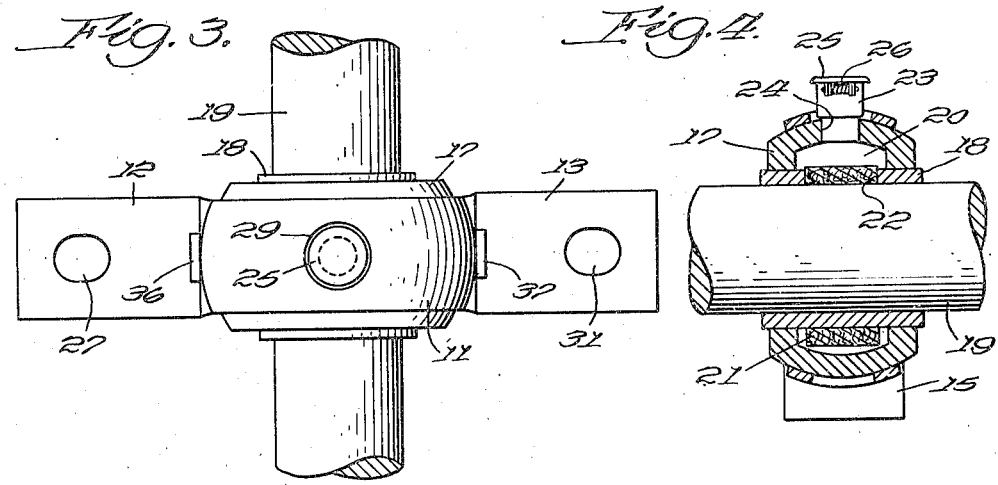
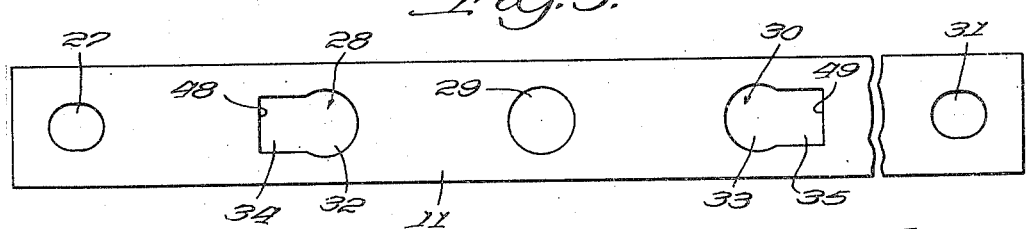
Inventor:
Kenneth W. Strunk.

Aug. 23, 1949.   K. W. STRUNK   2,479,791
PILLOW BLOCK BEARING
Filed June 10, 1946   2 Sheets-Sheet 2
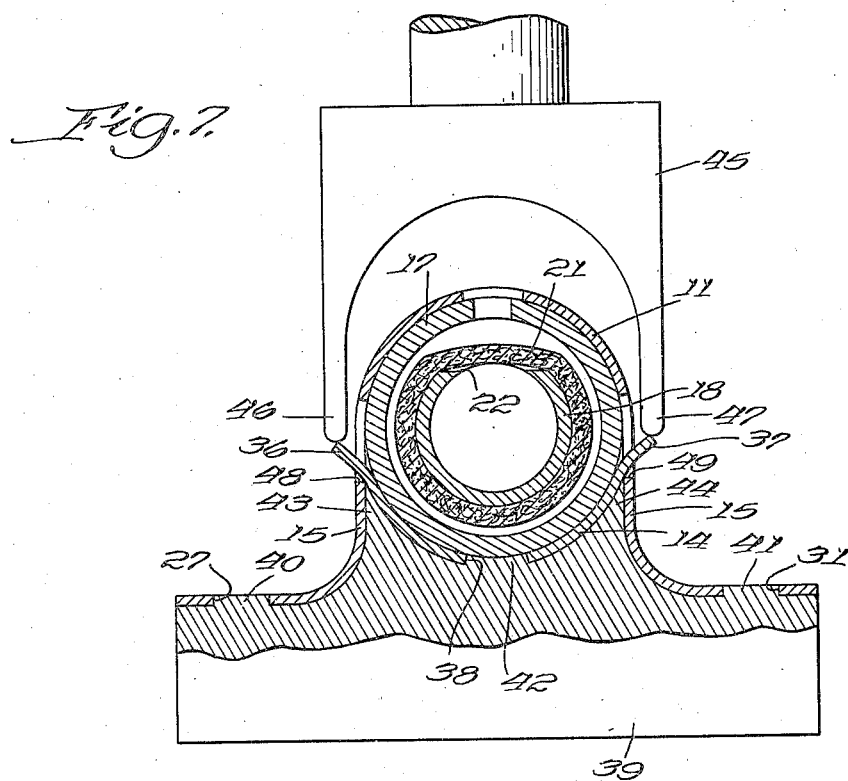
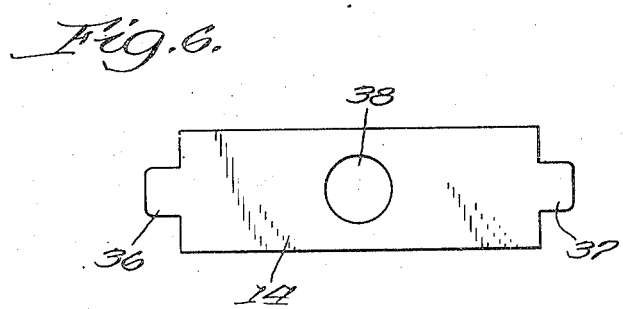
Inventor:
Kenneth W. Strunk.
By Kenneth T. Snow
Atty.

Patented Aug. 23, 1949

2,479,791

UNITED STATES PATENT OFFICE 2,479,791

PILLOW BLOCK BEARING

Kenneth W. Strunk, Oak Park, Ill.

Application June 10, 1946, Serial No. 675,576

4 Claims. (Cl. 308—72)

This invention relates to a new and improved pillow block bearing and has for one of its principal objects the provision of a sheet metal fabricated bearing housing.

An important object of this invention is the provision of a two-piece sheet metal housing for shaft mountings of the pillow block type wherein the two housing parts complement each other in a manner to properly support a shaft bearing.

A further important object of this invention is to provide a self-aligning pillow block bearing of the sheet metal housing type.

A still further object of this invention is the provision of a two-piece sheet metal housing clinched together in a manner to form a full annular socket for a ball-type inner ring.

Another and further important object of this invention is to provide a pillow block bearing self-lubricated from a reservoir provided therein.

Still another object of the invention is to provide a method of forming and assembling a sheet metal pillow block bearing housing.

Other and further important objects of this invention will become apparent from the disclosures in the following specification and accompanying drawings, in which:

Figure 1 is a front elevational view of the pillow block bearing of this invention.

Figure 2 is an end view of the bearing as shown in Figure 1.

Figure 3 is a top plan view of the bearing as shown in Figures 1 and 2.

Figure 4 is a sectional view taken on the line 4—4 of Figure 1.

Figure 5 is a plan view of a portion of the pillow block bearing housing prior to forming.

Figure 6 is a plan view of the complementary portion of the bearing housing.

Figure 7 shows the formed housing members mounted on an assembly die and being clinched together.

As shown in the drawings:

The reference numeral 10 indicates generally a pillow block bearing outer housing. The housing consists of a strap member 11, formed in substantially inverted U-shape and having outwardly bent flanges 12 and 13 at the bottom thereof, an upright U-shape tie strap 14 having outwardly inclined legs joining the legs or side portions 15 and 16 of the U-shaped strap 11. The two housing members 11 and 14 combine to form a full annular socket for an inner ring member 17. The inner surface of the annular socket is concave and the outer annular surface of the ring member 17 is convex so that the ring 17 within the outer housing 10 forms a ball and socket joint. As best shown in Figure 4 a sleeve-like bearing journal 18 is held within and extends slightly beyond the sides of the ring 17. A shaft 19 is journaled within the bearing 18.

Pillow block bearings are primarily used for the journaling of shafting, and often times it is impossible to overcome slight misalignments in shafting. If rigid pillow block bearings were employed where the shaft was not in perfect axial alignment, the result would be a binding of the shaft within the bearing. The self-aligning characteristics of this invention are therefore quite important, and when the device is viewed as in Figure 4 it will be evident that any misalignments in the shaft 19 may be compensated for directly by the ring 17 moving within the housing 10 to a new center of alignment.

The ring 17 is provided with an inner annular groove 20 constituting a lubricant reservoir in which a lubricating wick 21 is placed. As best shown in Figures 4 and 7, the sleeve journal 18 is provided with a cut-out portion 22 which permits the oil wick 21 to come in contact with the shaft 19 and thus lubricate the shaft within the journal 18.

As best shown in Figures 1, 2, and 4 an oil cup 23 is press-fitted within a radial hole 24 in the ring 17 extending from the lubricant reservoir to the exterior surface of the ring. The oil cup is of the type having a cover 25 maintained in closed position by a spring hinge 26. Lubricant such as oil is put in the cup 23 through the top thereof and enters the inner annular chamber 20 within the ring 17, thereupon soaking the wick 21 which imparts lubricant to the shaft 19.

As best shown in Figure 5, the outer strap 11 of the sheet metal housing 10 is provided with apertures 27, 28, 29, 30, and 31. The apertures 27 and 31 are used for fastening the pillow block bearing to some stationary object. Further, these apertures 27 and 31 are used, as shown in Figure 7, to assist in centering the housing on the clinching dies. The aperture 29 is positioned at the top and center of the housing 10 and as shown in Figure 4 permits the oil cup 23 to pass therethrough with sufficient clearance around the periphery thereof so that the bearing may be self-aligning.

The remaining two apertures 28 and 30 are keyhole in shape. The circular portions 32 and 33 of the keyhole apertures are similar in size to the central aperture 29 and are used for the same purpose. In many cases the shaft journal of this invention is not employed in a standing position as shown in Figure 1 but rather is mounted on a vertical wall so that one or the other of the sides 15 or 16 is at the top thereof. In such case it may be desirable to insert the oil cup through the side that is at the new top. However, this is not essential to successful operation of the self-lubricating oil wick within the inner annular ring chamber.

The lower or straight portions 34 and 35 of the apertures 28 and 30 are for the passage of upwardly and outwardly extending tongue members 36 and 37 on the outwardly inclined legs of tie strap 14 as best shown in Figure 6. The tie strap is also provided with an aperture 38 to receive the passage of an oil cup therethrough when the bearing is in an inverted position from that shown in Figure 1. In addition to the single function, the aperture 38 is also employed to center the tie strap 14 within the clinching jig or die as shown in Figure 7.

As shown in Figure 7, an important part of this invention is the assembly of the housing members 11 and 14. A supporting die or jig 39 is provided with an upper surface contour identical in shape to the under surface of the pillow block bearing of this invention. The housing member 11 is centered and maintained in position on the die 39 by projections 40 and 41 on the die extending up into the apertures 27 and 31, respectively. The tie strap 14 has its tongue portions 36 and 37 inserted through the square portions 34 and 35 of the apertures 28 and 30 in the supporting strap 11. A center projection 42 extends up into the aperture 38 in the tie strap 14 and with the aid of upwardly projecting portions 43 and 44 maintains the tie strap 14 in fixed relationship with respect to the supporting strap 11. In order to clinch the members 11 and 14 together, the tongue members 36 and 37 are bent down over the outside of the side members 15 and 16, respectively, of the supporting strap 11. This is accomplished by an upper die or jig member 45 having downwardly extending bending members 46 and 47 which contact the tongue members 36 and 37, respectively. This upper die 45 is then brought down under pressure, causing the tongues 36 and 37 to bend downwardly and back over the lower edges 48 and 49 of the apertures 28 and 30, respectively. During assembly of the housing members 11 and 14, the ring member 17, the oil wick 21, and the sleeve journal 18 are all positioned therewithin so that when the clinching operation is completed the assembly is complete with the exception of the insertion of the oil cup 23. After clinching of the tongue members 36 and 37 all the bearing members are held in fixed position with respect to each other, permitting rotational movement only between the ring 17 and the annular concave housing 10.

The subject bearing eliminates the massive weight and volume of the ordinary cast pillow block bearings and makes more effective the sheet metal housing by the particular clinching of the two portions that go to form the housing. In the present case, once the tongue members 36 and 37 are driven home by the forming jig 45 there is no possibility of the bearing becoming distorted or the assembly becoming loose inasmuch as there are no pins or other locking members on which the assembly relies.

Numerous details of construction may be varied throughout a wide range without departing from the principles disclosed herein, and I therefore do not propose limiting the patent granted hereon otherwise than as necessitated by the appended claims.

What is claimed is:

1. A pillow block type of shaft mounting including a ring member having an outer convex annular surface, a supporting strap having an inner concave annular surface partially surrounding said ring member, said supporting strap having outwardly extending flanges, a tie strap forming a fully complementary portion to said supporting strap and completing the full annular snug surrounding of said ring member, said supporting strap having openings in the sides thereof, said tie strap having integral tongue members at each end extending upwardly through and clinched down and over the openings in the supporting strap at a position closely adjacent said ring member, and a shaft supporting bearing positioned within said ring member, whereby the bearing after assembly is self-aligning and rigid in construction and resists inward or outward collapsing of said supporting strap.

2. A pillow block bearing comprising a housing including an inverted U-shaped supporting strap having substantially vertical side members with outwardly bent flanges at the bottom thereof, an upright U-shape tie strap having outwardly inclined legs extending between and maintaining the vertical side members of the inverted U-shaped strap fixedly spaced apart and combining with said inverted U-shaped supporting strap to form a full snug annular socket, said supporting strap having opposed openings in the legs of the inverted U, and said tie strap having integral tongues at the upper end of each of the outwardly inclined legs, said tongues passing upwardly and outwardly through and bent down over the lower edges of the openings in the legs of the supporting strap, and a shaft bearing carried within said housing and closely supported around its full periphery by said housing.

3. A self-aligning pillow block type of shaft mounting including a shaft bearing, a ring member carrying said shaft bearing and having a convex outer annular surface, a sheet metal housing for said ring member comprising an inverted U-shaped supporting strap with vertical legs having a concave inner surface adapted to extend substantially around said ring member and having aligned openings in the U-legs and a tie strap having a concave surface complementing said U-shaped supporting strap and completing the full annular snug surrounding of said ring member, and means for locking said housing members together, said means including upwardly and outwardly extending tongue members on the ends of said tie strap and projecting through the aligned openings in the U-legs, said tie strap tongues having their ends bent over the lower edges of the aligned openings in the supporting strap and lying vertically and parallel with said vertical legs.

4. A self-aligning pillow block type of shaft mounting including a shaft bearing, a ring member carrying said shaft bearing and having a convex outer annular surface, a formed sheet metal housing for said ring member comprising a U-shaped supporting strap having a concave inner surface adapted to extend substantially around said ring member and having aligned openings in the U-legs, a tie strap having a concave surface fully complementing said U-shaped supporting strap and completing the snug surrounding of said ring member, said tie strap having tongue members at each end thereof passing through the aligned openings in the U-legs and bent down over the lower edges of said openings.

KENNETH W. STRUNK.

REFERENCES CITED

The following references are of record in the file of this patent:

UNITED STATES PATENTS

| Number | Name | Date |
|---|---|---|
| 1,687,668 | Himes | Oct. 16, 1928 |
| 2,258,040 | Young | Oct. 7, 1941 |
| 2,270,663 | Searles | Jan. 20, 1942 |
| 2,300,754 | Whiteley | Nov. 3, 1942 |